US012643482B2

(12) United States Patent
Tran et al.

(10) Patent No.: US 12,643,482 B2
(45) Date of Patent: Jun. 2, 2026

(54) LUGGAGE COMPARTMENT COVER FOR A MOTOR VEHICLE

(71) Applicant: BOS GmbH & Co. KG, Ostfildern (DE)

(72) Inventors: Huan Tran, Ostfildern (DE); Carsten Meyer, Kirchheim unter Teck (DE); Manfred Swientek, Ostfildern (DE); Bartlomiej Szczygiel, Katowice (PL)

(73) Assignee: BOS GMBH & CO. KG, Ostfildern (DE)

( * ) Notice: Subject to any disclaimer, the term of this patent is extended or adjusted under 35 U.S.C. 154(b) by 464 days.

(21) Appl. No.: 18/470,742

(22) Filed: Sep. 20, 2023

(65) Prior Publication Data

US 2024/0101033 A1     Mar. 28, 2024

(30) Foreign Application Priority Data

Sep. 22, 2022    (DE) .......................... 102022210027.1

(51) Int. Cl.
B60R 5/04                (2006.01)
(52) U.S. Cl.
CPC .................................... B60R 5/047 (2013.01)
(58) Field of Classification Search
CPC ...................................................... B60R 5/047
See application file for complete search history.

(56) References Cited

U.S. PATENT DOCUMENTS

| | | | | |
|---|---|---|---|---|
| 5,618,077 | A | * | 4/1997 | Ament .................... B60R 5/047 |
| | | | | 296/37.16 |
| 5,676,415 | A | * | 10/1997 | Ament .................... B60R 5/047 |
| | | | | 296/37.16 |
| 5,961,172 | A | | 10/1999 | Ament et al. |

(Continued)

FOREIGN PATENT DOCUMENTS

| | | |
|---|---|---|
| DE | 19621009 C1 | 10/1997 |
| DE | 102009036605 B3 | 8/2010 |

(Continued)

OTHER PUBLICATIONS

German Office Action issued in corresponding German Application No. 10 2022 210 027.1, mailed May 9, 2023 (6 pages).

*Primary Examiner* — Aaron L Lembo
(74) *Attorney, Agent, or Firm* — FLYNN THIEL, P.C.

(57) ABSTRACT

A luggage compartment cover for a motor vehicle including a flexible cover sheet windable on and unwindable from a winding shaft mounted rotatably in a cassette housing. Opposite end regions of the cassette housing are each provided with a holder for releasable, interlocking fixing of the cassette housing in vehicle-side holding receptacles. A holder has a blocking pawl pivotable between release and blocking positions and, in a vehicle-mounted state of the cassette housing, the blocking pawl engages behind a blocking contour of a vehicle-side holding receptacle. A mechanical securing element is mounted movably between a functional position blocking the blocking pawl in the release position and an inoperative position releasing the blocking (Continued)

pawl for a pivoting movement. The securing element is assigned a mechanical positive control which forcibly transfers the securing element into the inoperative position when the holder of the cassette housing is inserted into the vehicle-side holding receptacle.

10 Claims, 4 Drawing Sheets

(56) References Cited

U.S. PATENT DOCUMENTS

| | | | | |
|---|---|---|---|---|
| 7,014,239 | B2 * | 3/2006 | Ehrenberger | ........... B60R 5/047 |
| | | | | 296/37.16 |
| 7,354,087 | B2 * | 4/2008 | Ehrenberger | ........... B60R 5/047 |
| | | | | 296/37.16 |
| 9,573,527 | B2 * | 2/2017 | Murray | ................... B60R 5/047 |
| 11,052,827 | B2 | 7/2021 | Seel et al. | |
| 11,541,817 | B2 | 1/2023 | Liu et al. | |

FOREIGN PATENT DOCUMENTS

| | | | |
|---|---|---|---|
| DE | 102018125299 | B3 | 1/2020 |
| DE | 102021110126 | B3 | 7/2022 |
| EP | 1334876 | A2 | 8/2003 |

* cited by examiner

LUGGAGE COMPARTMENT COVER FOR A MOTOR VEHICLE

CROSS-REFERENCE TO RELATED APPLICATION

This claims priority from German Application No. 10 2022 210 027.1, filed Sep. 22, 2022, the disclosure of which is hereby incorporated by reference in its entirety.

TECHNICAL FIELD

The invention relates to a luggage compartment cover for a motor vehicle, comprising a flexible cover sheet, which is held so as to be able to be wound up and unwound on a winding shaft which is mounted rotatably in a cassette housing, the opposite end regions of which cassette housing are each provided with a holder for the releasable, interlocking fixing of the cassette housing in vehicle-side holding receptacles, a holder comprising a blocking pawl which is pivotable between a release position and a blocking position and, in a state of the cassette housing mounted on the vehicle, engages behind a blocking contour of a vehicle-side holding receptacle.

BACKGROUND AND SUMMARY

A luggage compartment cover of this type is known from DE 10 2018 125 299 B3. The known luggage compartment cover is provided for use in a luggage compartment of a passenger vehicle and has a cassette housing in which a winding shaft is rotatably mounted. A cover sheet is held so as to be able to be wound up and unwound on the winding shaft and emerges from the cassette housing through a longitudinal slot. Opposite end sides of the cassette housing both have an end cap by means of which the cassette housing can be fastened releasably in vehicle-side holding receptacles. One end cap has profilings for axial insertion into the corresponding holding receptacle. The opposite end cap is provided with a pivotably mounted locking pawl which, in a state mounted fixedly in the vehicle, engages behind a blocking contour of the corresponding vehicle-side retaining receptacle. To remove the cassette housing, the blocking pawl has to be unlocked manually and held in said unlocked position. Subsequently, the cassette housing is raised in the vehicle vertical direction in the region of the end cap provided with the blocking pawl. The cassette housing is then pulled out of the opposite holding receptacle approximately coaxially with respect to a longitudinal extent of the cassette housing and can be completely removed from the luggage compartment.

An aspect of the invention to provide a luggage compartment cover of the type mentioned at the beginning which permits particularly easy handling during installation or removal relative to vehicle-side holding receptacles.

This is achieved in that a mechanical securing element is provided which is mounted movably between a functional position blocking the blocking pawl in the release position and an inoperative position releasing the blocking pawl for a pivoting movement, and in that the securing element is assigned a mechanical positive control which forcibly transfers the securing element into the inoperative position when the holder of the cassette housing is inserted into the vehicle-side holding receptacle. The solution according to the invention means that the blocking pawl does not have to be manually loaded during insertion of the cassette housing into, or removal thereof from, the holding receptacle. This task is in fact taken on by the mechanical securing element, and therefore particularly easy handling of the luggage compartment cover during installation into or removal from a luggage compartment of the motor vehicle is made possible for an operator.

In a refinement, the mechanical positive control has a positive control member which is mounted on an end cap of the cassette housing so as to be movable between a starting position protruding outward over an outer contour of the end cap and a load position displaced into the end cap. The positive control member is mounted movably in the end cap and, in the starting position, protrudes with a partial region outward over the outer contour of the end cap, preferably axially parallel to a center longitudinal axis of the winding shaft. The movable mounting can be realized by a pivoting mounting, by a rectilinear linear guide or by a curved linear guide. Accordingly, in the starting position, the positive control member forms a finger which projects beyond the outer contour of the end cap and, during the insertion of the cassette housing, and accordingly upon striking against a corresponding contact contour of the vehicle-side holding receptacle, is pushed into the end cap, as a result of which a corresponding movement of the securing element inevitably also takes place. The associated contact contour of the vehicle-side holding receptacle is preferably a run-on slope which, during the insertion of the end cap of the cassette housing into the vehicle-side holding receptacle, and upon the positive control member striking against the contact contour, introduces a force into the positive control member, the force bringing about the desired displacement of the positive control member in the direction of the load position.

In a further refinement, the mechanical securing element is mounted movably in the region of the end cap of the cassette housing, and the securing element has a driver contour which projects into a movement path of the positive control member in such a manner that the positive control member transfers the securing element, during a movement from the starting position in the direction of the load position, into the inoperative position. In the inoperative position, the securing element is removed from the blocking pawl such that the blocking pawl is released for movement into the blocking position. Accordingly, during the insertion of the cassette housing into the vehicle-side holding receptacles, and upon the positive control member striking against the contact contour of the associated holding receptacle, the positive control member carries along the driver contour of the securing element and unlocks the blocking pawl by the securing element being carried along, i.e. transferred, from the functional position into the inoperative position.

In a further refinement, the securing element is assigned a spring arrangement which spring-loads the securing element permanently in the direction of the functional position. In an advantageous manner, the securing element is mounted rotatably. When the securing element is mounted rotatably, the spring arrangement is preferably in the form of the torsion spring, in particular a leg spring, one leg of which is supported on the end cap fixed on the housing and the other leg of which is supported on the securing element.

In a further refinement, the positive control member is mounted in a linearly movable manner between the starting position and the load position, and the positive control member is assigned a restoring spring which subjects the positive control member to spring force permanently in the direction of the starting position. The restoring spring is preferably in the form of a helical compression spring, one end of which is supported fixed to the housing in the region of the end cap and the other end of which is supported on the positive control member. The positive control member is advantageously in the form of a linearly movable finger in the manner of a piston. An outer end region is advantageously provided with an oblique contact contour which is complementary to the oblique run-on surface of the holding receptacle.

In a further refinement, the blocking pawl and the securing element have mutually complementary latching profilings which interlockingly intermesh in the functional position of the securing element and in the release position of the blocking pawl. One latching profiling here is preferably in the form of a latching hook and the other latching profiling on the respective opposite component is in the form of a latching receptacle.

In a further refinement, the opposite holder of the cassette housing has a blocking element which, in a blocking position, engages in the longitudinal direction of the cassette housing in a recess of the corresponding vehicle-side holding receptacle. The blocking element can preferably be formed fixedly on a corresponding end cap of the cassette housing. The blocking element can be in single- or multi-part form. Alternatively, the blocking element is mounted movably relative to the end cap of the holder of the cassette housing. Also in the case of a movable mounting, the blocking element can be in single- or multi-part form.

In a further refinement, the blocking element is mounted movably between the blocking position, in which the blocking element protrudes on the end side over an end face of the end region of the cassette housing, and a release position, in which the blocking element is arranged recessed in the end region of the cassette housing. The end region of the cassette housing is preferably formed by an end cap. The end cap can be mounted in a linearly movable manner relative to a central housing region of the cassette housing in the longitudinal direction of the cassette housing. With such an embodiment, the blocking element is arranged fixedly on the end face of the end cap. The movable mounting of the blocking element arises in this embodiment by means of the movable mounting of the end cap. Alternatively, the end cap is fixedly connected to the central housing region of the cassette housing. In this embodiment, the blocking element is mounted movably relative to the end cap. In an advantageous manner, the blocking element is mounted in a linearly movable manner parallel to a longitudinal extent of the cassette housing.

In a further refinement, the blocking element is assigned a spring device which spring-loads the blocking element permanently in the direction of the blocking position. The spring device is preferably in the form of a helical compression spring, one end of which is supported in the region of the cassette housing, in particular in the region of the end cap, and the other end of which is supported on the blocking element. The helical compression spring is oriented coaxially with respect to the blocking element in order to exert a compressive force on the blocking element alongside the linear movability of the blocking element.

Further advantages and features of the invention emerge from the claims and from the description below of a preferred exemplary embodiment of the invention that is illustrated with reference to the drawings.

DETAILED DESCRIPTION

Figure 1:
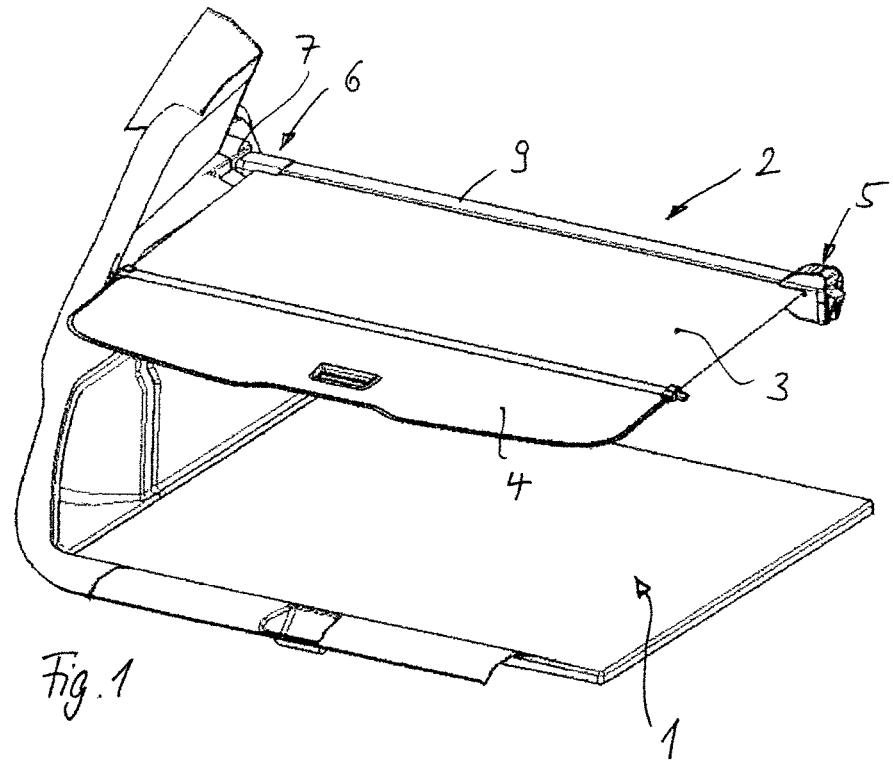
FIG. 1 shows a perspective illustration of an embodiment of a luggage compartment cover according to the invention in a luggage compartment of a passenger vehicle.

According to FIG. 1, a rear region of a passenger vehicle has a luggage compartment 1 which is delimited forward in the longitudinal direction of the vehicle by a rear seat bench, not illustrated specifically. The luggage compartment, which is part of the vehicle interior of the passenger vehicle, is delimited rearward in the longitudinal direction of the vehicle by an openable tailgate which is coupled pivotably to body supporting parts of a body of the passenger vehicle.

The luggage compartment 1 is assigned a luggage compartment cover 2 which has a flexible cover sheet 3. The cover sheet 3 is held so as to be able to be wound up and unwound on a winding shaft W which is indicated with reference to FIGS. 3 and 4. The winding shaft W is mounted rotatably in a cassette housing 5, 6, 9. The cover sheet 3 is connected on an end region remote from the winding shaft to a dimensionally stable pull-out profile, not denoted specifically, which is adjoined by a dimensionally stable contour part 4. In the pulled-out covering position, as is illustrated in FIG. 1, the pull-out profile is releasably fixed by the contour part 4 in vehicle-side mountings which are arranged in the region of opposite body pillars that are adjacent to the tailgate.

The winding shaft W is mounted rotatably in a cassette housing 5, 6, 9 which, in a state mounted fixedly on the vehicle (FIG. 1), extends in the transverse direction of the vehicle approximately at window sill height of the vehicle body and is held releasably in vehicle-side holding receptacles 7, 8 (see FIGS. 2 to 7). The vehicle-side holding receptacles 7, 8 are provided fixed to the vehicle at opposite side window sills of the vehicle interior immediately behind a backrest arrangement of the rear seat bench. The cover sheet 3 in the wound-up inoperative position is accommodated within the cassette housing 5, 6, 9, with the pull-out profile, as seen in the longitudinal direction of the vehicle, being supported on the rear side in the region of a longitudinal slot of the cassette housing 5, 6, 9. The winding shaft W is provided, in a manner not illustrated specifically, with a winding spring which subjects the winding shaft W, and therefore also the cover sheet 3, permanently to torque in the winding-up direction. The cover sheet 3 is in the form of a flexible, textile, preferably multi-layered structure.

The cassette housing 5, 6, 9 has a cassette-shaped housing central part 9 extending over virtually an entire width of the cover sheet 3, and an end cap 5, 6 at both opposite end regions of the housing central part 9, wherein the two end caps 5, 6 are likewise dimensionally stable and are fixedly connected to the end regions of the housing central part 9. The end cap 5 is configured differently to the opposite end cap 6. In the drawings, as seen in the forward direction of travel of the passenger vehicle, the end cap 6 is positioned on the left side and the end cap 5 on the right side, in each case with respect to the state of the cassette housing 5, 6, 9 mounted fixed to the vehicle.

The two end caps 5, 6 can be mounted releasably in the respective opposite holding receptacle 7, 8 in order to be able to insert the luggage compartment cover into the holding receptacles 7, 8 or remove it therefrom.

Figure 2:
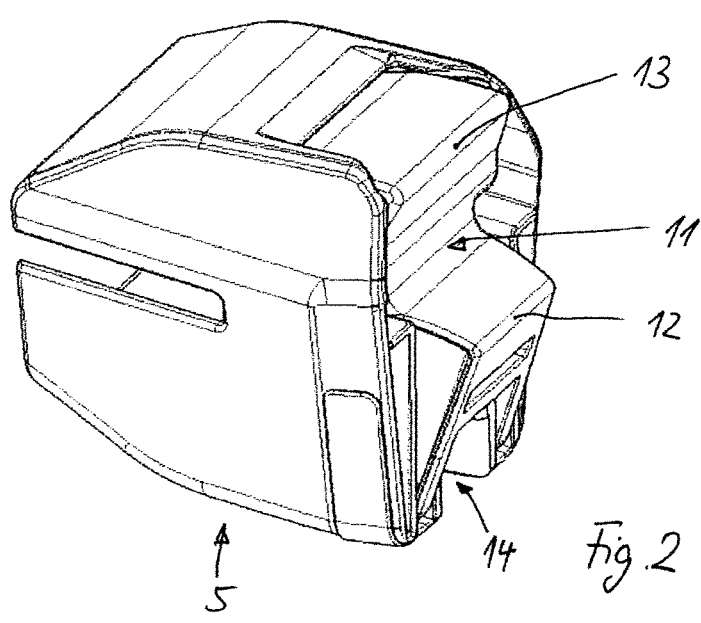
FIG. 2 shows an enlarged perspective illustration of an end cap of a cassette housing of the luggage compartment cover according to FIG. 1.

The right end cap 5 in the direction of travel has an end cap housing which is open outward in the transverse direction of the vehicle and in which a blocking pawl 11 is pivotably mounted. The blocking pawl 11 is mounted in the region of its underside on the end cap housing so as to be pivotable about a pivot axis, not illustrated, extending in the mounted state in the longitudinal direction of the vehicle, wherein the pivotability of the blocking pawl 11 in the transverse direction of the vehicle is delimited inward by a release position (see FIGS. 3 and 5) and outward by a blocking position which is shown in FIG. 2 and in FIG. 4. The blocking pawl 11 has a pawl portion 12 which, in the locked state within the vehicle-side holding receptacle 8, engages behind a blocking contour 18 of the holding receptacle 8. In addition, the blocking pawl 11 is provided with a manually operable actuating portion 13 which is provided on an upper end portion of the blocking pawl 11 remote from the pivot axis of the blocking pawl 11. Both the pawl portion 12 and the actuating portion 13 are formed integrally on the blocking pawl 11. The blocking pawl 11 is subjected to spring force outward permanently along the cassette housing by a compression spring arrangement 19, in the present case in the form of a helical compression spring, and thus outward in the transverse direction of the vehicle in the mounted state of the cassette housing 5, 6, 9 within the vehicle-side holding receptacle 8. The compression spring arrangement 19 is supported on the outside on an inwardly projecting extension of the blocking pawl 11 in the region of the pawl portion 12. At its opposite end, the compression spring arrangement 19 is supported on a housing extension 20 of the end cap housing, which housing extension is oriented outward coaxially with respect to an axis of rotation of the winding shaft W.

The blocking pawl 13 is secured interlockingly in its release position by a securing element 22 which is mounted rotatably to a limited extent about an axis of rotation 23 in the end cap housing. In the state of the cassette housing 5, 6, 9 mounted fixedly in the vehicle, the axis of rotation 23 is oriented in the longitudinal direction of the vehicle. The securing element 22 has two lever arms which protrude radially in different directions and of which one lever arm is in the form of a latching lever arm which bears a latching lug 29 on its outer end region. The other lever arm forms a driver contour in the form of a driver lever 30. In the blocking state of the blocking pawl 11, the hook-shaped latching lug 29 engages behind a latching recess 27 of the blocking pawl 11. The latching recess 27 is open downward, whereas the hook-shaped latching lug 29 of the securing lever is oriented upward.

The securing element 22 is subjected by the spring arrangement, in the present case in the form of a torsion leg spring 24, to torque permanently in the direction of a functional position locking the blocking pawl 11. For this purpose, the torsion leg spring has a first leg 25, which is supported in a stationary manner on the end cap housing, and a second spring leg 26, which is supported on the securing lever of the securing element 22.

The driver lever 30 of the securing element 22 is spatially assigned a driver cam M of a positive control member 15 in such a manner that, during a movement of the driver cam M, the driver lever 30 is carried along interlockingly in the direction of an inoperative position of the securing element 22, in which inoperative position the securing lever, which is provided with the latching lug 29, of the securing element 22 releases the latching recess 27 of the blocking pawl 11. The driver cam M is an integral extension of the positive control member 15, which extension is designed as a guide piston which is mounted in a linearly movable manner parallel to the axis of rotation of the winding shaft W in the end cap housing below the securing element 22. For this purpose, the end cap housing has a linear guide in which the positive control member 15 is mounted in a linearly movable manner between a starting position (FIG. 5), in which the positive control member 15 protrudes outward over a corresponding outer contour of the end cap housing, and a load position, in which the positive control member 15 is displaced in relation to the starting position parallel to the axis of rotation of the winding shaft W toward the center of the cassette housing 5, 6, 9 such that the positive control member 15 is displaced inward in relation to the discussed outer contour of the end cap housing. The positive control member 15 is permanently subjected to spring force in the direction of the starting position by a restoring spring 28 that is in the form of a helical compression spring.

Figure 3:
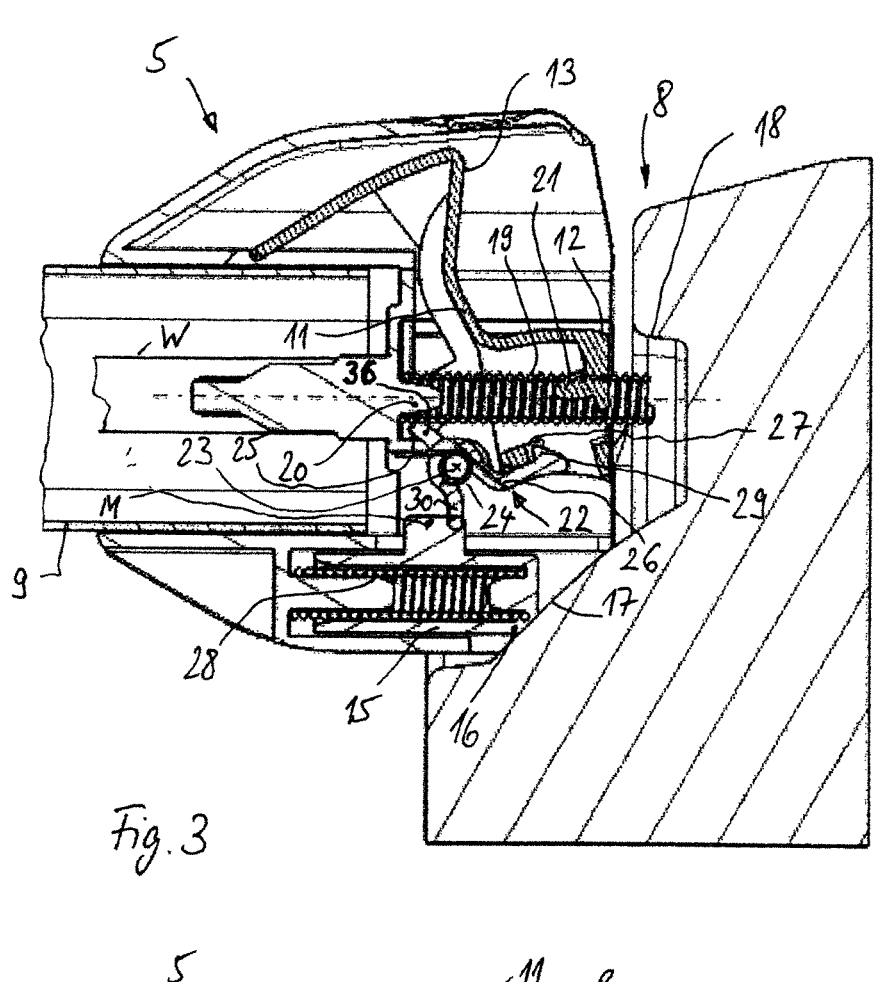
FIG. 3 shows an enlarged longitudinal sectional illustration of a region of the luggage compartment cover according to FIG. 1 level with the right end cap according to FIG. 2.

The driver lever 30 of the securing element 22 projects into the movement path of the driver cam M, the illustration according to FIG. 3 illustrating the superimposition of the movement paths of the driver lever 30 and of the driver cam M.

Figure 5:
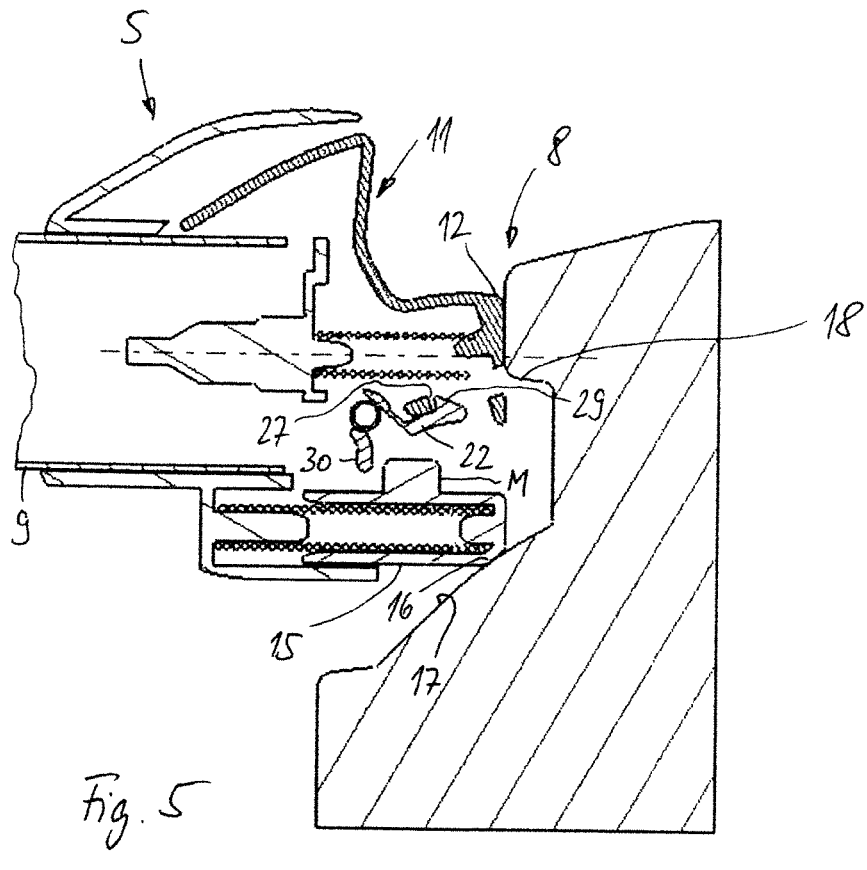
FIG. 5 shows the illustration according to FIG. 4, but in an intermediate position during a process of inserting the cassette housing into the vehicle-side holding receptacle.
Figure 6:
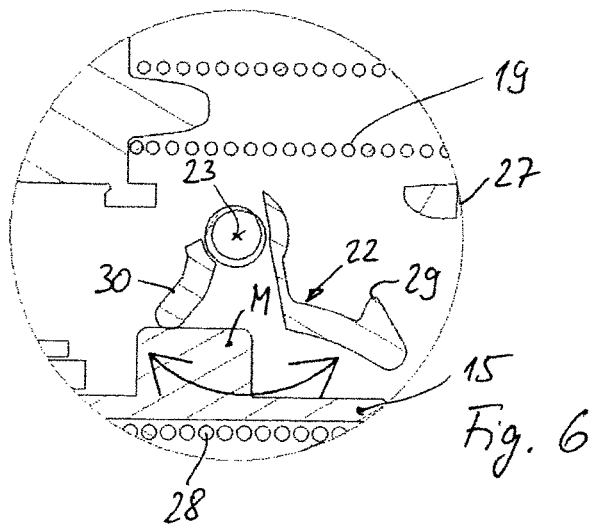
FIG. 6 shows an enlarged illustration of a detail of the illustrations according to FIGS. 3 to 5 in the region of a blocking element controlled by a positive control member.
Figure 7:
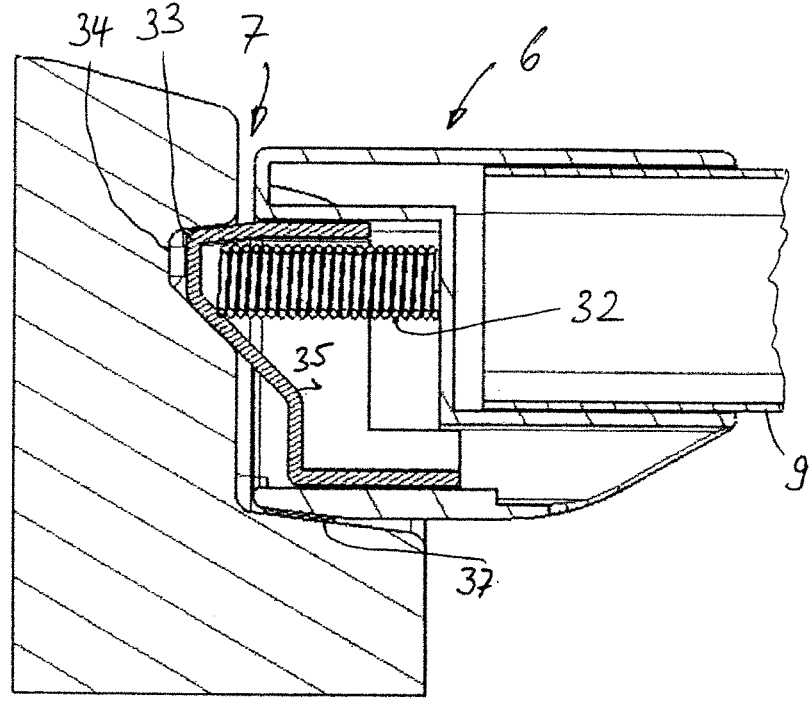
FIG. 7 shows a holder of the cassette housing opposite the holder according to FIGS. 3 to 6 in an opposite vehicle-side holding receptacle of the luggage compartment cover according to FIG. 1.

The underside on the outer end region of the positive control member 15 has a run-on slope 16 which enters into contact with a complementarily obliquely inclined contact contour 17 of the holding receptacle 8 as soon as the end cap 5 according to FIG. 5 is inserted from above into the holding receptacle 8. The oblique contact contour 17 is provided in web-shaped form in a central region of an overall width of the holding receptacle 8, as seen in the longitudinal direction of the vehicle. A width of the web-shaped contact contour 17 substantially corresponds to a width of the finger-shaped positive control member 15, as seen in the longitudinal direction of the vehicle. It can be seen with reference to FIG. 2 that the positive control member 15 is provided in the end cap housing within an underside, centrally arranged recess 14. Said recess 14 engages with its vertical side surfaces over the web-shaped contact contour 17 according to FIG. 5 when the cassette housing 5, 6, 9 is inserted, as a result of which centering of the end cap 5 within the vehicle-side holding receptacle 8 in the longitudinal direction of the vehicle is obtained as soon as the cassette housing is inserted.

Figure 4:
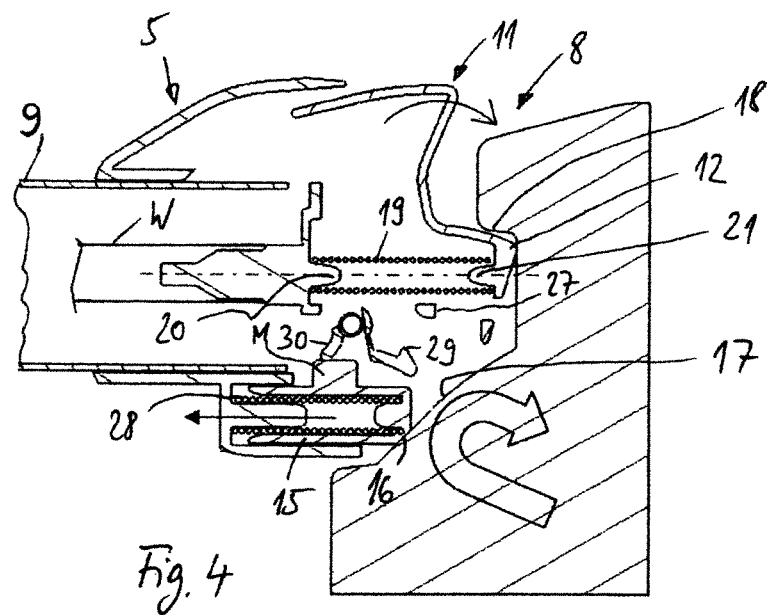
FIG. 4 shows a longitudinal sectional illustration similar to FIG. 3 of the cassette housing in a locked position within a vehicle-side holding receptacle.

As soon the contact contour 16 of the positive control member 15 strikes against the web-shaped supporting contour 17 of the holding receptacle 8, the dead weight of the cassette housing 5, 6, 9, optionally additionally also manual pressure applied by the operator from above, causes the positive control member 15 to be pressed along the oblique introduction of force in the region of the contact contour 16 in the transverse direction of the vehicle, in the direction of the arrow according to FIG. 4, toward the center of the cassette housing 5, 6, 9. As a result, the driver lever 30 (see FIGS. 5 and 6) is inevitably carried along in the counterclockwise direction by the driver cam M, and therefore the latching lug 29 releases the latching recess 27 of the blocking pawl 11. The securing element 31 is furthermore provided with a stop extension 36 which protrudes radially upward relative to the driver lever 30 and, in the counterclockwise direction, provides an end stop for the securing element 22 (see FIG. 3) by the stop extension 36 being supported on a corresponding housing portion of the end cap housing.

Releasing the blocking pawl 11 causes the compression spring arrangement 19 to press the blocking pawl 11 outward in the transverse direction of the vehicle. As soon as the end cap 5 has been moved downward in the vertical direction of the vehicle to such an extent that the pawl portion 12 can latch behind the blocking contour 18, the blocked end position of the end cap 5 and therefore of the cassette housing 5, 6, 9 within the holding receptacle 8 is reached.

For removal from the locked blocking position according to FIG. 4, the blocking pawl 11 is grasped manually in the region of the actuating portion 13 and pivoted counterclockwise according to FIGS. 3 to 5. As soon as the pawl portion 12 has left the undercut in the region of the blocking contour 18 of the holding receptacle 8, the restoring spring 28 presses the positive control member 15 outward, as a result of which the contact contour 16 slides upward along the web-shaped supporting contour 17 of the holding receptacle 8. An angular orientation of the complementary contact surfaces of the contact contour 16 and the supporting contour 17 is approximately 45° within a vertical plane which is spanned by the transverse direction of the vehicle and the vertical direction of the vehicle. The linear movement of the positive control member 15 outward because of the restoring force of the restoring spring arrangement 28 inevitably leads to the driver cam M also being moved outward again relative to the longitudinal extent of the winding shaft W. As a result, the driver lever 30 is released again, and therefore the spring arrangement 24 in the form of the torsion leg spring rotates the securing element 22 in the counterclockwise direction again. The blocking pawl 11 which is still acted upon by the manual actuating force of the operator is inevitably locked again by the latching lug 29 which once again engages behind the latching recess 27 of the blocking pawl 11. The operator can now release the blocking pawl 11 and remove the end cap 5 together with the cassette housing 5, 6, 9 upward.

In the region of the opposite end cap 6, the cassette housing has a blocking element 35 which is mounted in a linearly movable manner, said blocking element being mounted in a linearly movable manner along the axis of rotation of the winding shaft in an end cap housing of the end cap 6 between a blocking position, which extends outward in the transverse direction of the vehicle over an end face contour of the end cap 6, and an axially inwardly displaced release position. The blocking element 35 is permanently loaded by a spring device 32 in the direction of the blocking position. The blocking element 35 has a locking contour 33 which is assigned a complementary locking receptacle 35 in the region of the vehicle-side holding receptacle 7. The locking contour 33 engages behind the locking receptacle 34 of the holding contour 7 in the vertical direction of the vehicle in the blocking position of the end cap 6.

For installation of the end cap 6 and therefore of the cassette housing 5, 6, 9 in the region of the vehicle-side holding receptacle 7, the end cap 6 can be inserted in a simple manner from above into the holding receptacle 7. The blocking element 35 has a run-on slope below the locking contour 33, said run-on slope entering into contact with an upper edge of the holding contour 7 when the end cap 6 is inserted. The corresponding run-on slope presses the blocking element 35 counter to the compression spring force of the spring device 32 inward along the cassette housing, as a result of which the locking contour 33 can slide downward on a vertical end face of the holding receptacle 7 until the locking contour 33 is located level with the locking receptacle 34. The spring device 32 presses the blocking element 35 outward at this height, as a result of which the blocking element 35 is locked in the locking receptacle 34. In this locking position, a bottom-side supporting surface 37 of the end cap 6 rests on the supporting contour of the holding receptacle 7.

The end cap 6 can no longer be removed upward in the vertical direction of the vehicle from the locked state. On the contrary, first of all the cassette housing has to be unlocked in the region of the opposite end cap 5 and exposed obliquely upward and removed upward in order subsequently, by means of a slight longitudinal movement of the cassette housing in the transverse direction of the vehicle, to be able to pull the locking contour 33 of the blocking element 35 out of the locking receptacle 34 of the holding receptacle 7.

The invention claimed is:

1. A luggage compartment cover for a motor vehicle, comprising: a flexible cover sheet held so as to be able to be wound up and unwound on a winding shaft mounted rotatably in a cassette housing, opposite end regions of the cassette housing are each provided with a holder for a releasable, interlocking fixing of the cassette housing in vehicle-side holding receptacles, one of the holders comprising a blocking pawl pivotable between a release position and a blocking position and, in a state of the cassette housing mounted on the vehicle, the blocking pawl engages behind a blocking contour of a vehicle-side holding receptacle, wherein a mechanical securing element is provided and is mounted movably between a functional position blocking the blocking pawl in the release position and an inoperative position releasing the blocking pawl for a pivoting movement, and wherein the mechanical securing element is assigned a mechanical positive control, the mechanical positive control forcibly transferring the mechanical securing element into the inoperative position when the holder of the cassette housing is inserted into the vehicle-side holding receptacle.

2. The luggage compartment cover as claimed in claim 1, wherein the mechanical positive control has a positive control member mounted on an end cap of the cassette housing so as to be movable between a starting position protruding outward over an outer contour of the end cap and a load position displaced into the end cap.

3. The luggage compartment cover as claimed in claim 2, wherein the mechanical securing element is mounted movably in the region of the end cap of the cassette housing, and wherein the mechanical securing element has a driver contour projecting into a movement path of the positive control member in such that the positive control member transfers the mechanical securing element, during a movement from the starting position in the direction of the load position, into the inoperative position.

4. The luggage compartment cover as claimed in claim 1, wherein the mechanical securing element is assigned a spring arrangement, the spring arrangement spring-loading the mechanical securing element permanently in the direction of the functional position.

5. The luggage compartment cover as claimed in claim 1, wherein the mechanical securing element is mounted rotatably.

6. The luggage compartment cover as claimed in claim 2, wherein the positive control member is mounted in a linearly movable manner between the starting position and the load position, and wherein the positive control member is assigned a restoring spring, the restoring spring subjecting the positive control member to a spring force permanently in the direction of the starting position.

7. The luggage compartment cover as claimed in claim 1, wherein the blocking pawl and the mechanical securing element have mutually complementary latching profilings, the latching profilings interlockingly intermeshing in the functional position of the mechanical securing element and in the release position of the blocking pawl.

8. The luggage compartment cover as claimed in claim 1, wherein the opposite other holder of the cassette housing has a blocking element, the blocking element in a blocking position engaging in the longitudinal direction of the cassette housing in a recess of the corresponding vehicle-side holding receptacle.

9. The luggage compartment cover as claimed in claim 8, wherein the blocking element is mounted movably between the blocking position, in which blocking position the blocking element protrudes on an end side over an end face of an end region of the cassette housing, and a release position, in which release position the blocking element is arranged recessed in the end region of the cassette housing.

10. The luggage compartment cover as claimed in claim 8, wherein the blocking element is assigned a spring device, the spring device spring-loading the blocking element permanently in the direction of the blocking position.

* * * * *